July 10, 1956 — G. C. PEARCE — 2,754,402
DOMESTIC APPLIANCE
Filed Aug. 26, 1953 — 2 Sheets-Sheet 1

INVENTOR.
George C. Pearce
BY R. K. Candor
His Attorney

July 10, 1956

G. C. PEARCE 2,754,402

DOMESTIC APPLIANCE

Filed Aug. 26, 1953

INVENTOR.
George C. Pearce
BY R R Candor
His Attorney

United States Patent Office 2,754,402
Patented July 10, 1956

2,754,402

DOMESTIC APPLIANCE

George C. Pearce, Dayton, Ohio, assignor to General Motors Corporation, Detroit, Mich., a corporation of Delaware Application August 26, 1953, Serial No. 376,608

6 Claims. (Cl. 219—37)

This application is a continuation-in-part of my co-pending application S. N. 338,707 filed February 25, 1953.

This invention relates to a domestic appliance and more particularly to a surface heating arrangement for the range top of a domestic range.

In present surface heating arrangements it is customary to provide an ornamental flanged trim ring fitting into the aperture of the range top. Such a trim ring is used to support the heating unit as well as the drip pan. This construction is somewhat costly and the trim ring ordinarily cannot be readily removed from the range for cleaning.

It is an object of my invention to eliminate the trim ring and to use the rim of the drip pan as a substitute for the trim ring and to individually support the drip pan as well as the heating unit from the range top which may be provided with a conventional aperture so that the heating unit may be interchangeable with other units.

These and other objects are attained in the form shown by providing a drip pan having an integral continuous rim large enough in diameter to rest upon the edges of the surface heating unit aperture in the top of a range. The heating unit is located within the drip pan and has a terminal portion extending through an elongated horizontal aperture in the upwardly extending wall of the drip pan to a hinge connection with the range top. The hinge connection is provided with a projection extending through the elongated horizontal aperture into supporting arrangement with one arm of the heating unit support. The drip pan has two additional apertures in the upwardly extending wall through which extend the other two arms of the heating unit support. These other two arms rest upon the step-type flange ordinarily provided in a conventional surface heating unit aperture.

Further objects and advantages of the present invention will be apparent from the following description, reference being had to the accompanying drawings wherein a preferred form of the invention is clearly shown.

Figures 1, 2, 3, 4, 5:
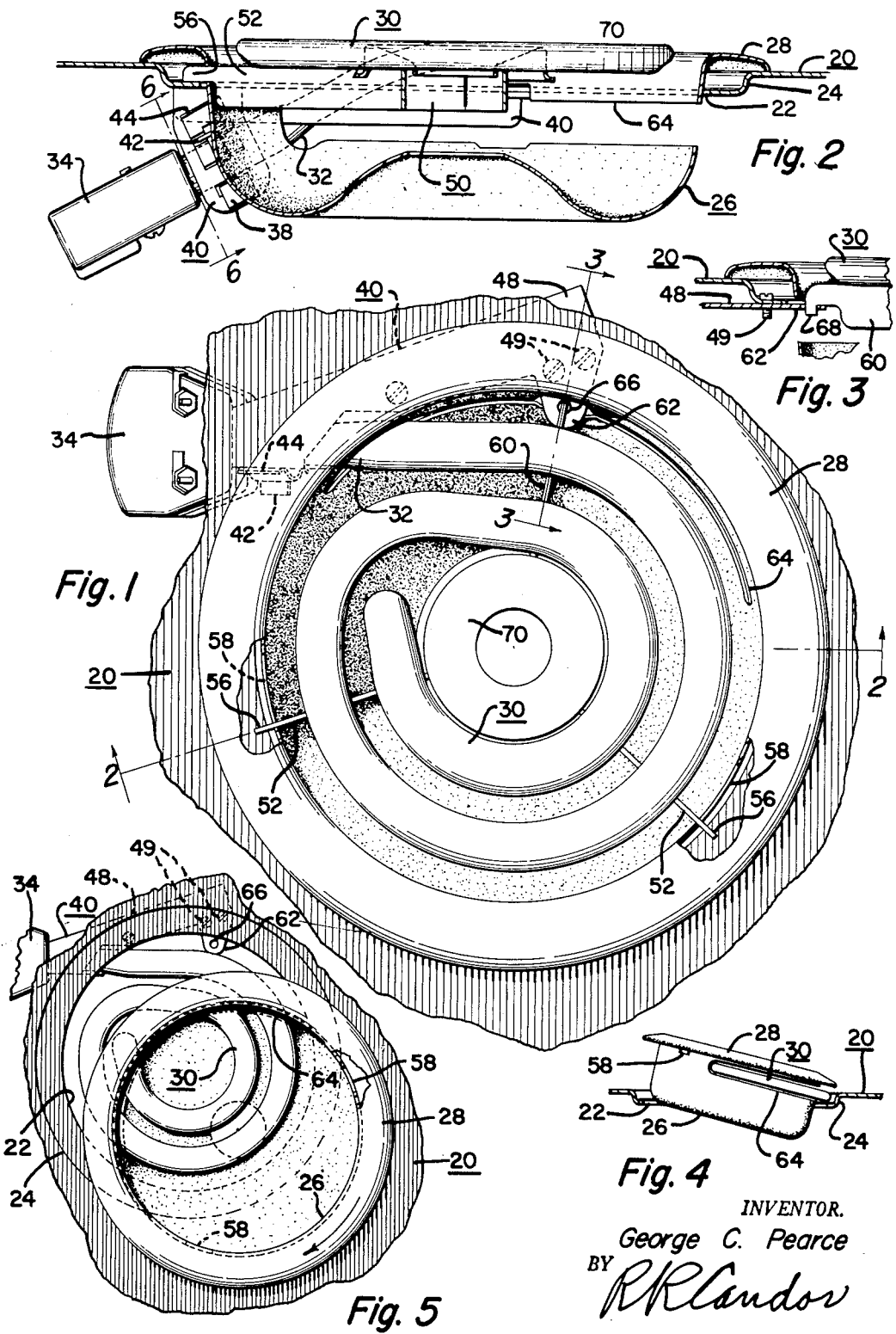
Figure 1 is a top view of a surface heating arrangement embodying one form of my invention.
Figure 2 is a sectional view taken along the lines 2—2 of Figure 1.
Figure 3 is a fragmentary sectional view taken along the lines 3—3 of Figure 1.
Figure 4 is a view in elevation showing the start of the operation of removing the drip pan from the aperture in the range top.
Figure 5 is a view showing the withdrawal of the drip pan from the surface heating unit.

Referring now to the drawings and more particularly to Figure 2, there is shown a portion 20 of a range top having a step-type flanged surface heating unit aperture 22 bordered by a shallow off-set step-type flange 24. This aperture 22 preferably is a standard aperture such as has been used for conventional surface heating unit arrangements for a number of years. For this reason my improved surface heating unit arrangement is interchangeable with present arrangements now in production and it is possible that they may be used alternately in the making of similar ranges.

According to my invention I provide a bowl-shaped drip pan 26 having a wide flanged rim 28 which takes the place of the usual trim ring. This wide flanged rim 28 has a sufficiently large outer diameter that it spans the flange 24 of the aperture 22 and rests directly on the flat top surface of the range top 20 as is clearly shown in Figures 2 and 7. Within the drip pan 26 protruding above its upper edge is an electric surface heating unit 30 in the form of a flat spiral. From the outermost portion of this surface heating unit 30 there extends downwardly at an angle of about 35° a terminal portion 32 which terminates in an insulated connector 34 containing the electrical terminals for the surface heating unit 30.

The portion 32 of the heater 30 has a cylindrical portion adjacent the connector 34. A generally U-shaped member 36, see Figure 6, extends around this cylindrical portion and has one end 38 extending through an aperture in the hinge bracket 40 and turned outwardly. The other end 42 of the member 36 extends through a second aperture in the hinge bracket 40 and is held in place by a U-shaped spring 44 of thin metal. This spring 44 extends through slots provided in the end-portion 42. The spring 44 bows outwardly away from the adjacent portion of the hinge bracket 40 so as to pull the U-shaped member 36 toward the hinge bracket 40 so that the bearing portion of the surface heating unit 30 is firmly held. The two aforementioned apertures in the hinge bracket 40 are sufficiently large to permit movement of the heater 30 in the plane of the vertical portion of the bracket 40. The U-shaped bracket 36 preferably has a circumferentially extending slot into which projects a lug 46 welded to the bearing portion of the surface heating unit 30 in such a position as to extend through the slot in the U-shaped member 36. This lug 46 prevents the bearing portion from moving axially in the U-shaped member 36 but permits a rotation of at least 90°.

The hinge bracket 40 has a horizontal portion 48 fastened by screws 49 to the flange portion 24 of the range top 20. The porcelain is wiped from around the screw heads and the screw heads are provided with lock washers to cut into the metal of the range top to provide a ground connection for the unit 30. The surface heating unit 30 is supported by a rigid three-armed support 50 provided with arms 52 each having a projecting shoulder 56 extending through the apertures 58 in the vertically extending portion of the top wall of the range. This permits the projecting shoulders to be concealed beneath the rim 28 and yet rest directly upon the flange 24 immediately beneath the rim 28.

To provide a support for the third arm 60 the horizontal portion 48 of the hinge bracket 40 has a projection 62 extending through an elongated horizontal aperture 64 in the upwardly extending side wall of the drip pan 26. The portion of this projection 62 within the rim 28 is provided with an aperture 66. The third arm 60 has a downwardly extending projection 68 (see Figure 3) which extends through this aperture 66 and limits the lateral movement of the three-armed support 50. The three-armed support 50 has a raised central ring or cylinder 70 fastened to its three arms 60 adjacent their intersection. It is surrounded by the smallest portion of the spiral member which forms the heating unit 30. This raised ring 70 therefore centers the three-armed support 50 relative to the innermost turn of the surface heating unit 30. Thus this raised ring insures the centering of the three-armed support relative to the heating unit 30.

Figure 6:
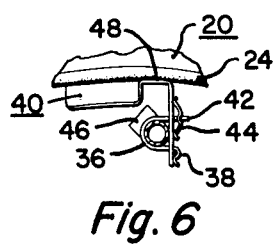
Figure 6 is a fragmentary sectional view taken along the lines 6—6 of Figure 2 showing the hinge connection.
Figure 7:
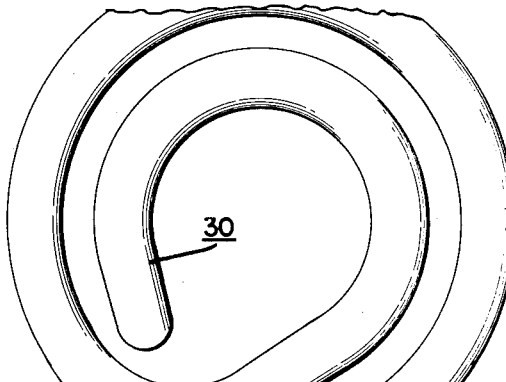
Figure 7 is a view illustrating the pivoting of the surface heating unit prior to removing its support.
Figure 8:
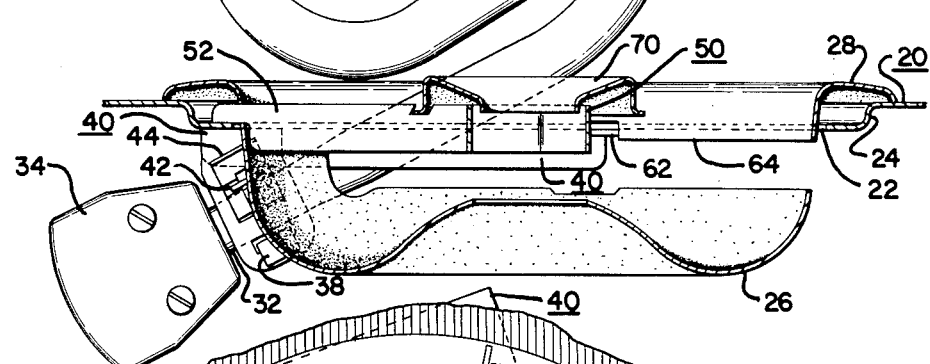
Figure 8 is a top view with the surface heating unit removed showing the location of the support in its normal position and showing the direction of removal.
Figure 8:
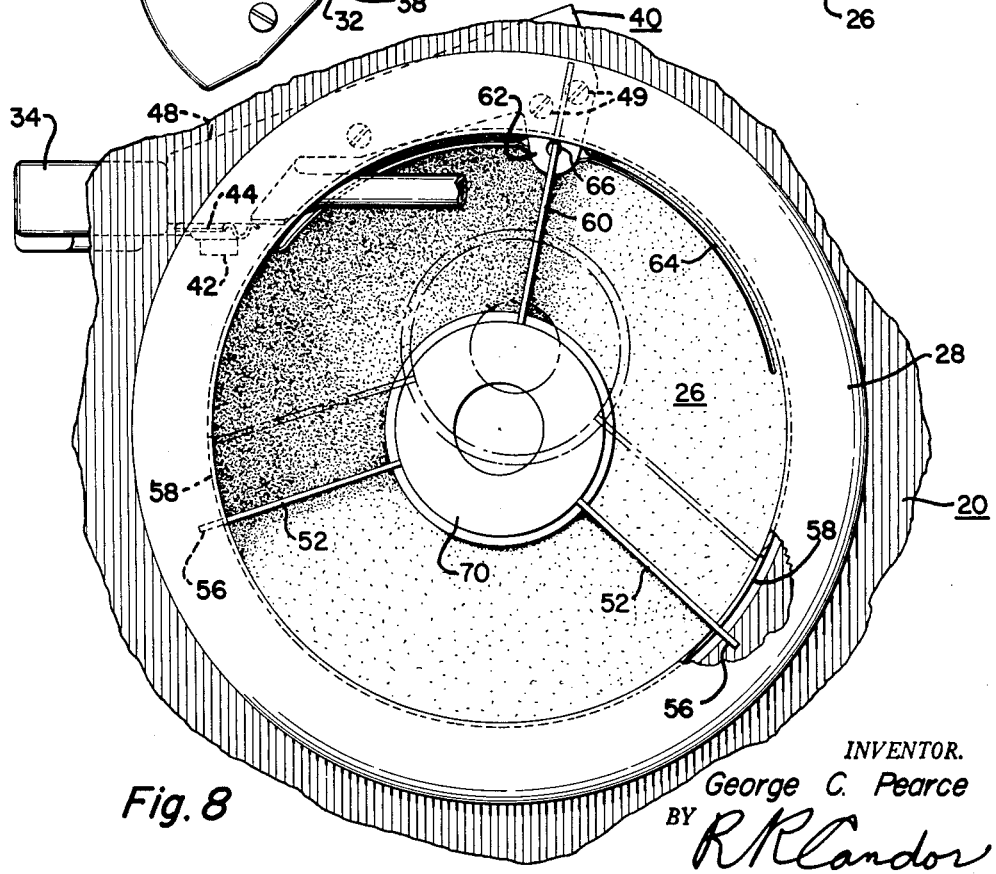

The surface heating unit 30 pivots as shown in Figures 4 and 7 on its bearing or hinge because of the hinge arrangement shown in Figures 2, 6 and 7. In so pivoting the one edge of the drip pan may be raised as shown in Figure 4 so that after removal of the three-armed support 50, the pan 26 can be readily withdrawn from the surface heating unit aperture 22 as shown in Figure 5. To make this possible, the horizontal elongated aperture 64 directly beneath and parallel to the rim 28 is made sufficiently long that the heating unit 30 may pass through it as illustrated in Figure 5. The three-armed support may be readily removed after lifting the surface heating unit 30 to the position shown in Figure 7. The arm 60 of the three-armed support 50 is then raised to lift the projection 68 out of the aperture 66 above the rim 28 and then is moved laterally in the direction of the arrow to the dot and dash line position shown in Figure 8 in alignment with the arm 60 until the projections 56 clear the apertures 58 in the drip pan 26. When this is done the three-armed support 50 may be readily lifted and removed.

With this arrangement the apertures 58 and 64 are practically unnoticeable when the surface heating unit is in place and they do not materially prevent the drip pan from performing its proper function of collecting drip and reflecting the radiant heat of the surface heating unit 30. The construction is economical and the drip pan 26 may be made of very thin material since it not required to bear any load. The surface heating unit arrangement may be used interchangeably with conventional heating arrangements since the aperture in the range top may be made the same for both present units and my new unit.

In accordance with the provisions of Rule 78a, reference is made to the following prior filed application: S. N. 344,867 filed February 23, 1953.

While the form of embodiment of the invention as herein disclosed constitutes a preferred form, it is to be understood that other forms might be adopted as may come within the scope of the claims which follow.

What is claimed is as follows:

1. A surface heating unit arrangement for a step-type flanged aperture in the range top of a domestic range including a bowl-shaped drip pan having a rim large enough in diameter to rest upon said range top outside the step-type flange of said aperture, a surface heating unit located within said drip pan, said unit having a plurality of supporting arms, said pan having a plurality of apertures located entirely in the portion immediately below said rim, a plurality of said arms extending through said apertures and having their end portions extending to and resting on said step-type flange.

2. A surface heating unit arrangement for a step-type flanged aperture in the range top of a domestic range including a bowl-shaped drip pan having a rim large enough in diameter to rest upon said range top outside the step-type flange of said aperture, a surface heating unit located within said drip pan, said unit having a plurality of supporting arms, said pan having a plurality of apertures located entirely in the portion immediately below said rim, a plurality of said arms extending through said apertures and having their end portions extending to and resting on said step-type flange, and a bracket fastened to said range top extending through one of the apertures, one of the arms extending to and resting upon said bracket.

3. A surface heating arrangement for an aperture in the range top of a range including a thin bowl-shaped drip pan having a continuous uninterrupted rim large enough in diameter to rest upon the range top surrounding the aperture, a surface heating unit located within said drip pan, said unit having a plurality of supporting arms, said pan having a plurality of apertures located entirely in the portion immediately below said rim, said range top having fixed supporting means spaced below said rim, a plurality of said arms extending through said apertures beneath said rim into supporting contact with said supporting means.

4. A surface heating unit arrangement for an aperture in the range top of a domestic electric range including a thin one-piece bowl-shaped drip pan having a continuous seamless uninterrupted rim large enough in diameter to extend over a substantial width of the portion of the range top forming the border of said aperture with portions of said rim spaced a substantial distance above the range top, a surface heating unit located within said drip pan, said pan having a plurality of laterally spaced apertures located entirely in the portion immediately below said rim, said heating unit having a plurality of supporting arms extending outwardly through said apertures into the space between said rim and the portion of the range top immediately beneath said rim and resting in supporting relationship upon the portion of the top forming the border of said aperture.

5. A surface heating unit arrangement for an aperture in the range top of a domestic electric range including a thin one piece bowl-shaped drip pan having a continuous seamless uninterrupted rim large enough in diameter to extend over a substantial width of the portion of the range top forming the border of said aperture with portions of said rim spaced a substantial distance above the range top, a surface heating unit located within said drip pan, said pan having a plurality of laterally spaced apertures located entirely in the portion immediately below said rim, said heating unit having a plurality of supporting arms extending outwardly through said apertures into the space between said rim and the portions of the range top immediately beneath said rim and resting in supporting relationship upon the portion of the top forming the border of said aperture, said heating unit having a terminal portion extending outwardly through one of said apertures into electrical connection with the electrical conducting system of said range, said one aperture being sufficiently long and high that the part of the heating unit within the pan will pass through it.

6. A surface heating unit arrangement for an aperture in the range top of a domestic electric range including a thin one piece bowl-shaped drip pan having a continuous seamless uninterrupted rim large enough in diameter to extend over a substantial width of the portion of the range top forming the border of said aperture with portions of said rim spaced a substantial distance above the range top, a surface heating unit located within said drip pan, said pan having a plurality of laterally spaced apertures located entirely in the portion immediately below said rim, said heating unit having a plurality of supporting arms extending outwardly through said apertures into the space between said rim and the portions of the range top immediately beneath said rim and resting in supporting relationship upon the portion of the top forming the border of said aperture, said heating unit having a terminal portion extending outwardly through one of said apertures into electrical connection with the electrical conducting system of said range, said one aperture being sufficiently long and high that the part of the heating unit within the pan will pass through it, said range top being provided with a bracket having a portion extending inwardly through said one aperture into said pan, one of said supporting arms extending over and resting upon said bracket portion.

References Cited in the file of this patent

UNITED STATES PATENTS

| | | |
|---|---|---|
| 2,260,793 | Russell | Oct. 28, 1941 |
| 2,506,554 | Tuttle | May 2, 1950 |
| 2,508,552 | Tuttle | May 23, 1950 |
| 2,624,827 | Young | Jan. 6, 1953 |
| 2,662,157 | Vallorani | Dec. 8, 1953 |
| 2,667,564 | Cunningham | Jan. 26, 1954 |
| 2,668,899 | Rutenber | Feb. 9, 1954 |